(12) United States Patent
Witte et al.

(10) Patent No.: US 7,257,979 B2
(45) Date of Patent: Aug. 21, 2007

(54) DEVICE AND METHOD FOR RESHAPING BAR-SHAPED MATERIALS PARTICULARLY FOR DRAWING AND EXTRUDING

(75) Inventors: Werner Witte, Unna (DE); Lothar Illgen, Iserlohn (DE); Peter Bilstein, Menden (DE)

(73) Assignee: BL Chemie GmbH & Co. KG, Neuenrade (DE)

( * ) Notice: Subject to any disclaimer, the term of this patent is extended or adjusted under 35 U.S.C. 154(b) by 126 days.

(21) Appl. No.: 10/531,911

(22) PCT Filed: Oct. 21, 2002

(86) PCT No.: PCT/DE02/03965

§ 371 (c)(1),
(2), (4) Date: Oct. 11, 2005

(87) PCT Pub. No.: WO2004/039513

PCT Pub. Date: May 13, 2004

(65) Prior Publication Data

US 2006/0123870 A1    Jun. 15, 2006

(51) Int. Cl.
*B21C 35/00* (2006.01)
(52) U.S. Cl. ............... 72/257; 72/56; 72/256; 72/286; 72/430
(58) Field of Classification Search ........... 72/56, 72/256, 257, 342.94, 342.96, 274, 286, 430, 72/707
See application file for complete search history.

(56) References Cited

U.S. PATENT DOCUMENTS

| | | | | |
|---|---|---|---|---|
| 3,203,211 A | * | 8/1965 | Mallinckrodt | 72/56 |
| 3,212,311 A | * | 10/1965 | Inoue | 72/19.6 |
| 3,823,589 A | * | 7/1974 | Tikhonovich et al. | 72/56 |
| 3,911,706 A | | 10/1975 | Davis | |
| 4,067,216 A | * | 1/1978 | Khimenko et al. | 72/56 |
| 2005/0247098 A1 | * | 11/2005 | Witte et al. | 72/287 |

FOREIGN PATENT DOCUMENTS

DE    197 03 878    6/1970

* cited by examiner

*Primary Examiner*—Ed Tolan
(74) *Attorney, Agent, or Firm*—Hoffman, Wasson & Gitler PC

(57) ABSTRACT

An apparatus for reforming rod-shaped, electrically conductive and/or magnetizable materials, in particular for drawing and extruding, having the following features: the apparatus has a female mold having a die, which forms the tool for reforming; the apparatus has an inductor of an electric linear motor, by means of which a traveling electric field can be produced; the inductor includes at least one first group at least with first coils; the first coils in the first group are arranged axially next to one another and thus form a channel; using the inductor it is possible to produce a traveling field in the channel which has a magnetic flux density having a gradient in the axial direction of the channel, which has an amplitude of greater than $B=1$ T.

24 Claims, 4 Drawing Sheets

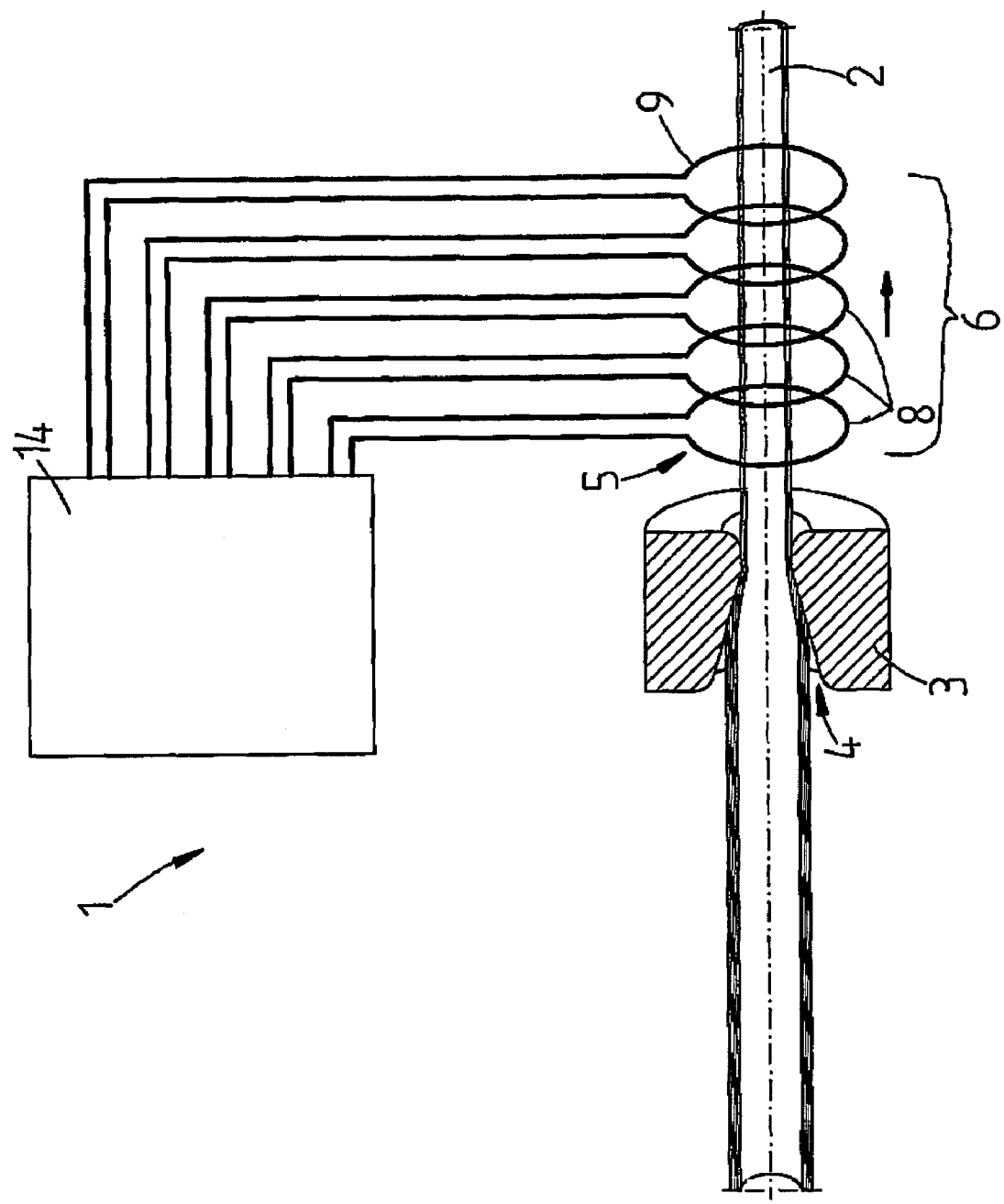

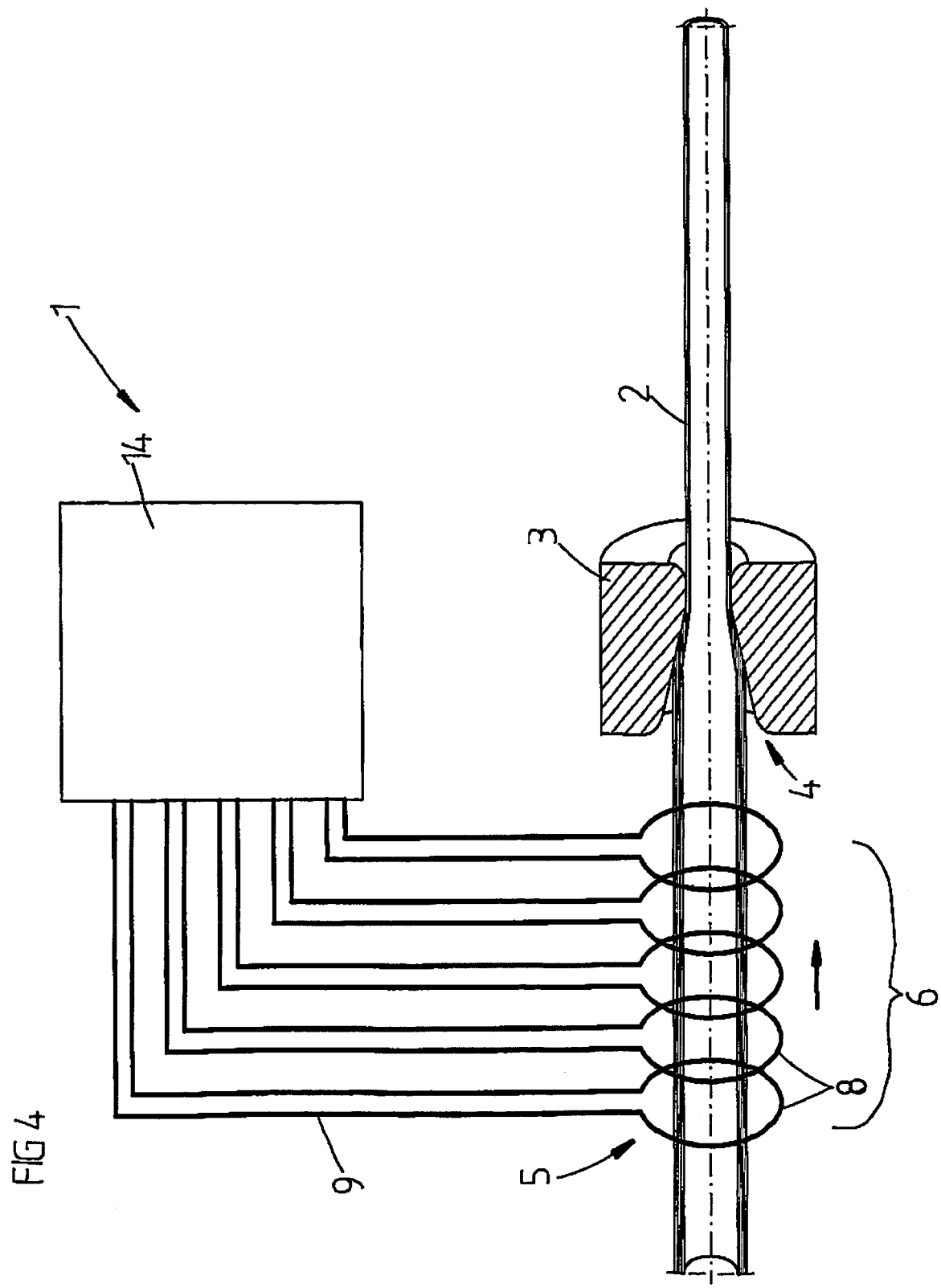

DEVICE AND METHOD FOR RESHAPING BAR-SHAPED MATERIALS PARTICULARLY FOR DRAWING AND EXTRUDING

BACKGROUND OF THE INVENTION

This application is a 35 USC 371 of PCT/03965 filed Oct. 21, 2002.

The invention relates to an apparatus and a method for reforming electrically conductive and/or magnetizable, rod-shaped materials, in particular for drawing and extruding.

Such an apparatus has a female mold having a die, which forms the tool for reforming. In addition, the apparatus has an inductor of an electric linear motor. This inductor has at least one first group at least with first coils, these first coils in the first group being arranged axially next to one another, and the center, which remains free, of the coils forming a channel. The rod-shaped material, which is to be reformed and which is electrically conductive and magnetizable, is introduced into this channel. This rod-shaped material forms the armature of the linear motor. Owing to the fact that a traveling magnetic field is produced in the channel of the inductor by the inductor, the armature, i.e. the rod-shaped material, is moved on in the channel. In the process, with an appropriate rating for the inductor, the rod-shaped material can be moved through the die of the female mold, as a result of which the rod-shaped material is reformed.

Such an apparatus is known, for example, from the document U.S. Pat. No. 3,911,706 A. The document discloses a linear drawing machine for drawing a rod-shaped material through the die of a female mold. For this purpose, the inductor is arranged such that it lies downstream of the die in the drawing direction. The rod-shaped material which is introduced into the die in a manner which is not disclosed in any more detail is passed through the inductor downstream of the die in the drawing direction, as a result of which the in-ductor, in interaction with the rod-shaped drawing material which acts as the armature, forms a linear motor which draws the rod-shaped drawing material through the die and thus reforms it.

The disadvantage of the drawing machines disclosed in this document is the fact that the forces produced by the inductor in interaction with the drawing material are only sufficient for a reforming process, in particular for larger drawing materials, if the inductor, i.e. the drawing machine, has a length of several hundred meters. Such a drawing machine, however, is unrealistic since it cannot be produced and operated at reasonable cost.

Owing to the abovementioned disadvantages, the development of such a linear drawing machine has not been pursued further up until now. Rather, development work has been concentrated on the improvement of conventional linear drawing machines. Such a conventional drawing machine is known, for example, from the document DE 197 03 878 A1. The linear drawing machine disclosed in this document has two moveable drawing carriages which are driven on a track, each drawing carriage having associated travel paths, which lie one behind the other in the drawing direction but which partially overlap one another. These drawing carriages, whose travel paths are both provided downstream of the die in the drawing direction, have clamping jaws. The two drawing carriages, alternately, use these clamping jaws to draw the drawing material through the die. The drawing carriages are in this case provided with conventional drive means, i.e. either such drawing carriages have dedicated drives, usually electric motors, or else they are driven by means of transmission devices of a common drive for both drawing carriages. Although the drive and the control of the drawing carriages which are matched to one another are complex, a lack of alternatives has meant that this technique has been adopted in the past in the case of linear drawing machines, since the drawing could not be converted expediently by means of the basically simple drive technology disclosed in the document U.S. Pat. No. 3,911,706 A.

The present invention was therefore based on the object of developing a linear drawing machine known from the document U.S. Pat. No. 3,911,706 A such that expedient use of a linear drawing machine according to the invention is possible. In particular, in the process the apparatus according to the invention should have smaller dimensions than the apparatus known from the prior art.

A further concern of the present invention was also to make it easier to introduce the material to be reformed into the die of the female mold. It should likewise be possible to use the apparatus according to the invention not only to reform the rod-shaped material by means of drawing, but also by extruding the rod-shaped material to be reformed through the die of the female mold of the apparatus.

SUMMARY OF THE INVENTION

The objects according to the invention are achieved by an apparatus and method for reforming rod-shaped, electrically conductive and/or magnetizable materials, which remedies the disadvantages of the methods known from the art.

The apparatus according to the invention and the method according to the invention are based on the knowledge that the magnetic flux density, which is present in the channel of the apparatus known from the closest prior art (cf. U.S. Pat. No. 3,911,706 A) is insufficient to make possible an apparatus of compact size having sufficient performance. In order to have at one's disposal an apparatus having sufficient performance, i.e. in particular sufficient development of force, this apparatus must be able to produce, according to the invention, a traveling magnetic field in the channel formed by the inductor which has a magnetic flux density having an amplitude of greater than B=1 tesla. Depending on the movement direction of the traveling magnetic field, in this case a force in the direction towards the die or away from the die can be utilized by the interaction between the inductor and the material to be reformed (armature). In the case of a force direction towards the die, this force may cause the material to be introduced into the die and/or the apparatus to be used for extrusion purposes. For extrusion purposes, in this case it is merely advantageous for the die to be arranged in the opposite direction with respect to the first group of coils to that for drawing.

In accordance with the invention, the inductor of an apparatus according to the invention may have a second group at least with first coils. The first group of coils and the second group of coils can then advantageously be arranged on opposite sides of the female mold, the coils in the two groups then preferably being coaxial with respect to the die of the female mold. With such an arrangement of the coils of the inductor in two groups in the transport direction of the rod-shaped material to be reformed upstream and downstream of the die of the female mold, it is possible both to push the material being transported through the die and to draw the rod-shaped material to be reformed through the die of the female mold. Drawing and extrusion may in this case take place independently of one another, i.e. the rod-shaped material is either exclusively extruded or else exclusively drawn. However, it is likewise possible for the drawing and extrusion to take place at the same time, i.e. the coils in the second group, which are arranged upstream of the female mold in the transport direction of the rod-shaped material, bring about extrusion, whereas, at the same time, the coils in the first group, which are arranged downstream of the female mold in the transport direction, bring about drawing of the rod-shaped material. With such an apparatus for simultaneous drawing and extrusion, greater reforming of the material to be reformed is possible.

In accordance with the invention, the first group and possibly the second group of coils of the inductor may have second coils, these second coils engaging around the first coils and being arranged coaxially with respect to the first coils. In addition, further coils, namely third, fourth, . . . coils may be provided which engage around the coils in the first and possibly the second group and are coaxial with respect to the second, third, . . . coils. The arrangement of the second, third, . . . coils makes it possible for the magnetic flux density in the channel to be increased. Such inductors are sometimes known as polysolenoid inductors.

In accordance with the invention, in each case disks made of a magnetizable material, which may possibly be perforated, are arranged between the coils which are arranged coaxially next to one another. In these disks, the magnetic flux produced by the coils can be combined. The disks may have an outer edge which is advantageously bent back to one side. This bent-back edge may then cover an adjacent, first coil or a stack of adjacent and coaxially arranged coils (first, second, third, . . . coils). Such coil/disk arrangements are also known as "pancake" arrangements.

In accordance with the invention, the apparatus may have means for cooling the rod-shaped material to be reformed. The means for cooling can apply a first cooling medium to the channel in which the rod-shaped material to be reformed is transported. This first cooling medium may be air or oil or another suitable cooling medium. In this case, it is sufficient if the cooling medium has a temperature of 0 to 40° C., preferably room temperature.

The electrical current density in the coils is advantageously greater than $J=10$ A/mm$^2$, in order to achieve a compact design.

In accordance with the invention, at least some of the coils may have conductors which have a resistivity of $\rho=0.017*10^{-6}$ Ωm or less. Some of the coils may likewise have conductors which are superconducting. In accordance with the invention, superconducting conductors may be made of a material which has a critical temperature of greater than $T=77$ K. In addition, some of the coils may have conductors which have a channel, as a result of which the conductor is in the form of a hollow conductor. A second cooling medium can be applied to such a channel in a conductor. As a result, the conductors can be cooled down in order to increase the electrical conductivity of the conductor. Such a conductor having a channel is advantageously produced from silver, gold, but preferably from copper or aluminum. Water, oil, liquid nitrogen, hydrogen or neon are advantageously used as the cooling medium for the purpose of cooling this conductor from the inside.

In a method according to the invention, in one step, the material to be reformed is introduced into the channel; in a further step, a traveling magnetic field having a magnetic flux density of at least $B=1$ T is produced in the channel and has a gradient in the direction of the channel; and, in another step, the material to be reformed is introduced into the die of the female mold. The sequence of the steps can in this can be varied in any desired manner. It is likewise possible for the step which comprises the introduction of the material to be reformed to be split into two substeps. It is likewise possible for the step which comprises the production of the traveling field to be split into two parts. Even if this step is split into two parts in this manner, the sequence of the (sub)steps can in principle be combined in any desired manner.

BRIEF DESCRIPTION OF THE DRAWINGS

Further features and advantages of the present invention are made clear using the description below of preferred exemplary embodiments with reference to the attached drawings, in which:

FIG. 3 shows a schematic illustration of an apparatus according to the invention for drawing, FIG. 4 shows a schematic illustration of an apparatus according to the invention for extruding.

DETAILED DESCRIPTION OF THE INVENTION

Figure 1:
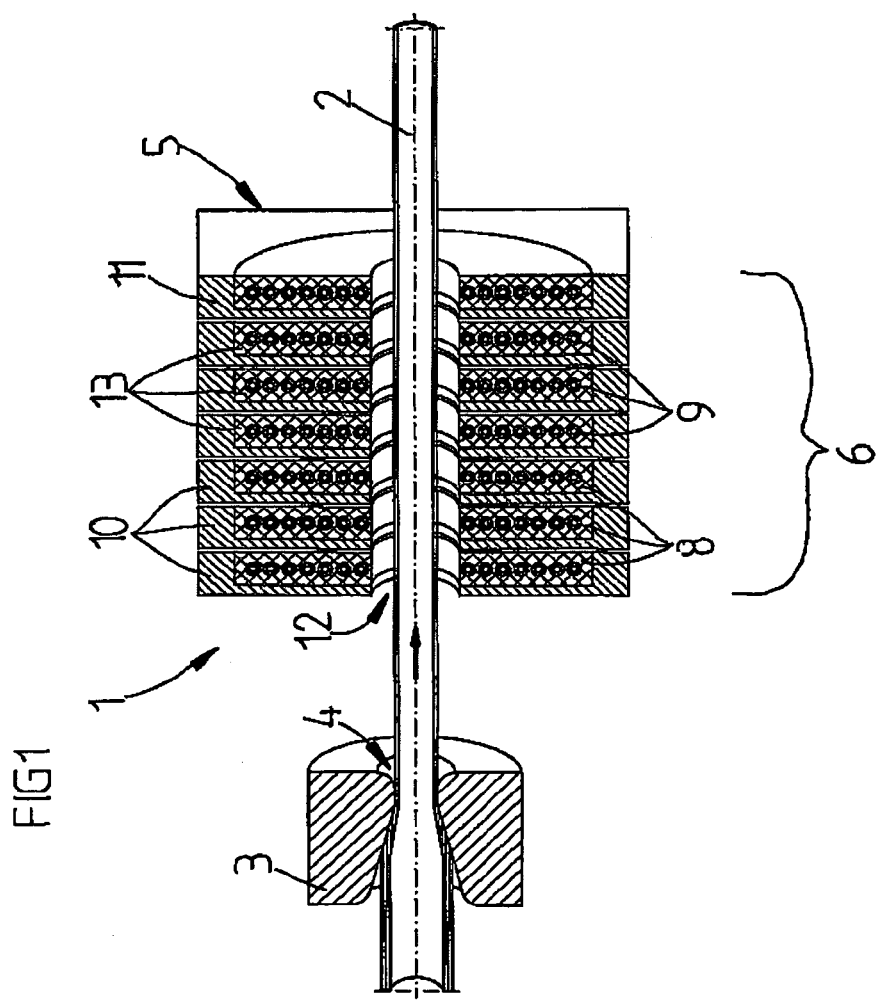
FIG. 1 shows a schematic illustration of an apparatus according to the invention.

Firstly, reference is made to FIG. 1. The apparatus 1 according to the invention which is illustrated schematically in FIG. 1 and is used for drawing a rod-shaped material 2 has a female mold 3 having a die 4 which tapers in the movement direction of the material 2. An inductor 5 is arranged downstream of the female mold 3 in the movement direction of the material 2. This inductor 5, together with the material 2 which is electrically conductive and/or magnetizable, forms an electric linear motor, the rod-shaped material 2 to be reformed forming the armature of the linear motor. The rod-shaped material 2 is generally a tube, whose outer cross section has been reduced in size.

The inductor 5 has a plurality of first electrical coils 8, in the case of which the windings from one conductor 9 are arranged on a plane which lies perpendicular to the movement direction of the rod-shaped material 2. In this case, the electrical conductor 9 is embedded in a disk comprising an isolator 13. The centers, which remain free, of these disks formed from the isolator 13 or of the coils 8 form a channel 12 which is axial with respect to the movement direction of the rod-shaped material 2 and axial with respect to the die 4.

Disks 10 made of a magnetizable material 10 are arranged between the disks comprising the isolator 13 which contain the coils 8. These disks 10 have an outer edge 11 which is bent back to one side. This bent-back, outer edge 11 of the disks 10 covers an adjacent coil.

The coil/disk arrangements illustrated in FIG. 1 which essentially form the inductor 5 are arranged downstream of the female mold 3 in the movement direction of the rod-shaped material 2, as a first group 6 of first coils 8. A traveling electrical field is produced by means of these coils 8 in the first group 6, and this traveling electrical field predetermines the movement direction of the rod-shaped material 2. The traveling magnetic field, which is passed, inter alia, into the magnetizable disks 11, has a magnetic flux density of at least 1 T in the center of the channel 12 formed by the inductor 5. This traveling magnetic field produces rotational electrical fields in the rod-shaped material and thus a current flow in the rod-shaped material 2. In turn, this current flowing in the rod-shaped material 2 produces a magnetic field which interacts with the traveling magnetic field which is produced by the inductor 5, and, as a result, a force in the direction of the traveling magnetic field is applied to the rod-shaped material 2.

Since the traveling magnetic field has a magnetic flux density of at least 1 T in the center of the channel 12, only compact inductors 5 having a manageable size are required for the application of the forces required for drawing the rod-shaped material 2 through the female mold 3.

The conductors 9 of the first coils 8 illustrated in FIG. 1 are conductors 9 which have an inner channel. These electrical conductors 9 are thus in the form of hollow conductors. Using means for cooling (not shown), a first cooling medium can be passed through the channels of the conductors 9, and this first cooling medium cools the electrical conductors 9 from the inside. Cooling of the electrical conductors brings about a significant increase in the electrical conductivity.

Figure 2:
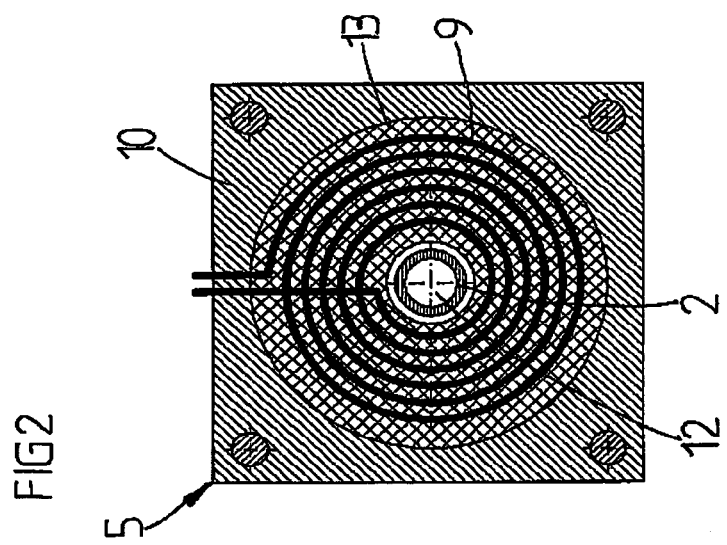
FIG. 2 shows a schematic, sectioned illustration through the inductor of an apparatus according to the invention.

With the cross section illustrated in FIG. 2 through the inductor 5 of an apparatus 1 according to the invention, the same reference numerals have been used for equivalent components as for the apparatus 1 according to the invention shown in FIG. 1. The inductor 5 shown in FIG. 2 differs from the inductor 5 illustrated in FIG. 1 only by the formation of the electrical conductors 9 of the first coils 8. In this case, the electrical conductor 9 is one which is made of a superconducting material. By means of cooling (not shown), this electrical conductor 9 can be cooled to a temperature of approximately 77° K. The superconducting material of the electrical conductor 9 then reaches its critical temperature, as a result of which the electrical conductivity suddenly increases.

FIG. 3 is a schematic illustration of how, by means of an apparatus according to the invention, the material 2 to be reformed can be reformed by drawing. The apparatus according to the invention illustrated in FIG. 3 has, for this purpose, a female mold 3 having a die 4, which is arranged upstream of an inductor 5 in the drawing direction. The inductor 5 has coils 8, of which in each case only one winding of the conductor 9 is illustrated schematically. The ends of the conductor 9 of the coils 8 are passed out of the inductor 5 and are connected to an electrical voltage source 14 for the purpose of supplying a voltage to the coils 8. The coils 8 in this first group 6 of coils 8 are supplied by the voltage source 14 such that a traveling magnetic field is produced in the inductor 5. The inductor 5 then acts, with a material 2 to be reformed introduced, as a linear motor, the material 2 to be reformed forming the armature of this linear motor.

For drawing purposes, firstly the voltage supply of the coils 8 in the first group 6 of coils 8 of the inductor 5 is accepted. The traveling magnetic field is produced. Then, the material 2 to be reformed is introduced into the die 4 of the female mold 3 using methods known from the prior art. As soon as the end of the material 2 to be reformed emerges from the die 4, the material 2 to be reformed is introduced into the inductor 5, as a result of which a force, which is produced by the traveling magnetic field in interaction with the material 2 to be reformed, is applied to the material 2 to be reformed in the direction of movement or the drawing direction.

With reference to FIG. 4, an explanation will now be given of how the extrusion takes place using an apparatus according to the invention. The apparatus illustrated schematically in FIG. 4 for extruding corresponds, in principle, to the design of the apparatus shown in FIG. 3. In contrast to the apparatus illustrated in FIG. 3, the apparatus illustrated in FIG. 4 has the first group 6 of first coils 8 upstream of the female mold 3 having the die 4 in the movement direction of the material 2 to be reformed.

Firstly, with the apparatus according to the invention shown in FIG. 4, the production of the traveling magnetic field by means of the inductor 5 is introduced by switching on the voltage sources 14. Then, the material 2 to be reformed is introduced into the inductor 5, as a result of which the abovedescribed interaction between the inductor 5 and the material 2 to be reformed 2 comes about which pushes the rod-shaped material 2 to be reformed in the movement direction of the traveling field. As a result, the material 2 to be reformed is pushed in the direction of the female mold 3 and introduced into the die 4 of the female mold 3. The force, which is applied by the linear motor formed by the inductor 5 and the material 2 to be reformed, is in this case sufficient for pushing the material 2 to be reformed through the die 4. By extruding the material 2, the material 2 is reformed. In this case, the cross section of the material 2 is reduced.

Figure 5:
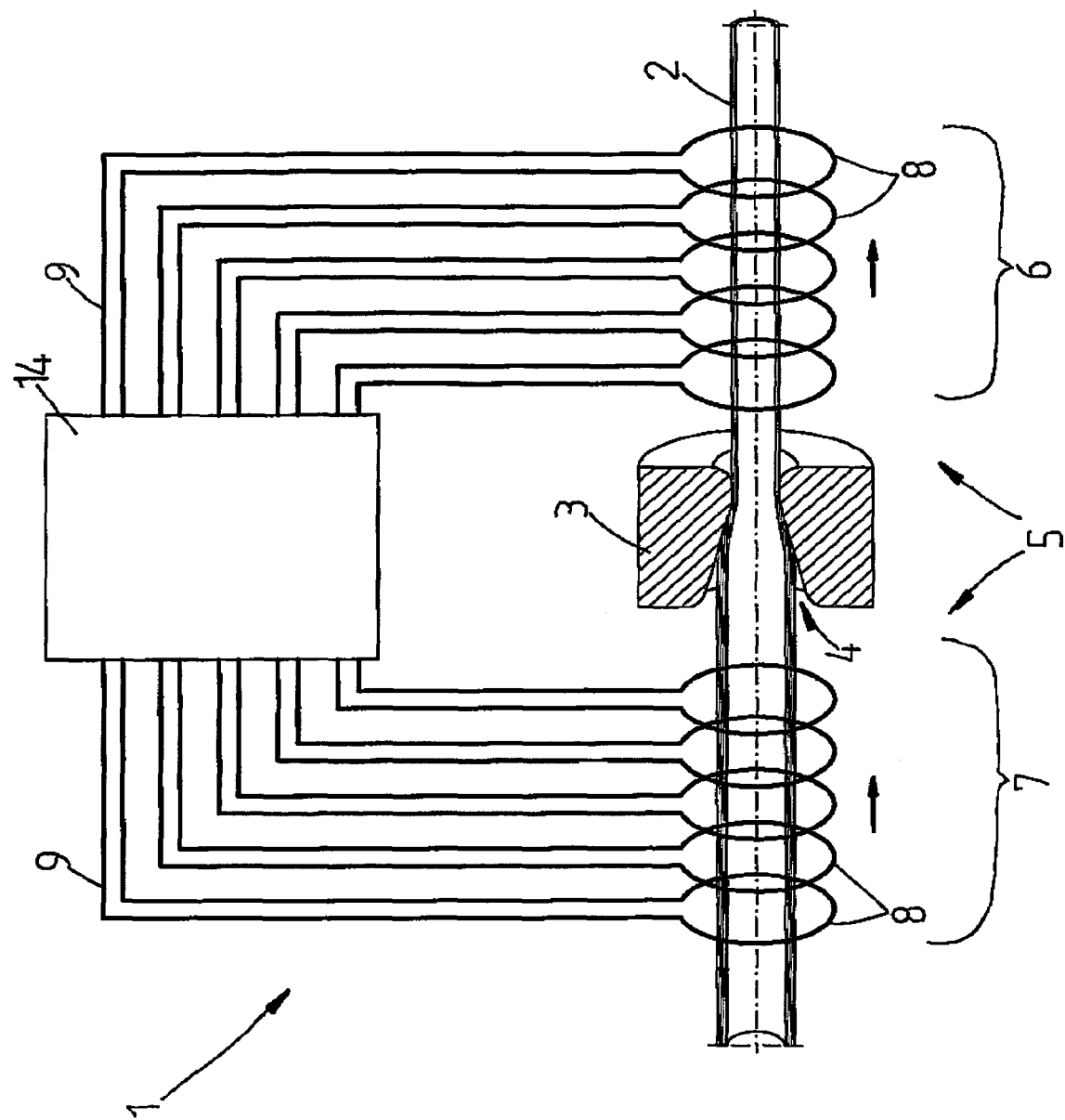
FIG. 5 shows a schematic illustration of an apparatus according to the invention for drawing and extruding.

With reference to FIG. 5, an explanation will now be given of how, using an apparatus 1 according to the invention, a material 2 to be reformed can be both extruded and drawn in order to reduce the cross section of this material 2. The apparatus according to the invention illustrated in FIG. 5 has, for this purpose, an inductor 5 having a first group 6 of first coils 8 and a second group 7 of first coils 8. The electrical conductors 9 of these coils 8 are passed out of the inductor and connected to an electrical voltage source 14. The coils in the first group 6 are in this case arranged downstream of the female mold 3 having the die 4 in the movement direction of the material 2 to be reformed, whereas the coils in the second group 7 are arranged upstream of the female mold 3 having the die 4 in the movement direction.

In order to reform the rod-shaped material 2, the coils 8 in the first group 6 and the coils 8 in the second group 7 have an electrical voltage applied to them. As a result, a traveling field is produced in the inductor 5 which has a movement direction which predetermines the movement direction of the material 2 to be reformed. Subsequently, the material 2 to be reformed is introduced into the inductor 5. The rod-shaped material 2 in this case initially passes into the part of the channel which is formed by the first coils 8 in the second group 7 of coils 8, and forms there the armature of a linear motor formed by the inductor 5. In this case, the material 2 to be reformed is pushed forwards in the movement direction by the force produced by the linear motor and is introduced into the die 4 of the female mold 3. The force which is produced by the coils 8 in the second group 7 in interaction with the material 2 to be reformed pushes the material 2 to be reformed through the die 4 and, as soon as the material 2 to be reformed has left the die 4, the material 2 to be reformed enters the part of the channel formed by the coils 8 of the first group 6, where the material 2 to be reformed forms with this part of the inductor 5 a linear motor which in turn applies a force to the material 2 to be reformed in the movement direction of the traveling field. As a result, both in the region of first group 6 and in the region of the second group 7 of the first coils 8, the material 2 to be reformed is subjected to forces.

The advantage of an apparatus 1 of this type for simultaneous drawing and extrusion is the fact that, in this case, no mechanical connection is provided for the purpose of transferring the forces to the material 2 to be reformed, i.e. there are no moveable parts (connection means) which are used for force transfer purposes. The problem with the conventional type of force transfer by means of mechanical connection means to the material 2 to be reformed is the fact that the material to be reformed can have different speeds upstream and downstream of the die 4. These different speeds then need to be carefully controlled for an optimum force transfer between the connection means and the material 2 to be reformed. Such complex regulation is not required in the apparatus according to the invention, since in this case there is no mechanical connection between the connection means for driving the material 2 to be reformed and the material 2 to be reformed. The force transfer in fact takes place in this case by means of electromagnetic interaction between the material 2 to be reformed and the inductor 5 of the apparatus 1 according to the invention. The electromagnetic force transfer takes place in contactless fashion, and at different speeds of the traveling magnetic field of the inductor 5 and the material 2 to be reformed, there is a slip. Such a slip is also known, for example, from an asynchronous motor between the rotor and the stator. This slip may be different in the region of the first group 6 of first coils 8, i.e. in the region downstream of the die 4, than a slip in the region of the second group 7 of first coils 8, i.e. in the region upstream of the die 4. Complex regulation for the purpose of compensating for the different speed of the material 2 to be reformed upstream and downstream of the die 4 is thus dispensed with. Such an apparatus makes possible, in one working step, increased reduction of the material 2.

LIST OF REFERENCE NUMERALS

1 Reforming apparatus
2 Material to be reformed
3 Female mold
4 Die
5 Inductor
6 First group of coils
7 Second group of coils
8 First coils
9 Electrical conductor
10 Disk
11 Outer, bent-back edge
12 Channel
13 Isolator
14 Electrical voltage source

What is claimed is:

1. An apparatus for reforming rod-shaped, electrically conductive and/or magnetizable materials comprising:
   the apparatus has a female mold having a die, which forms a tool for reforming;
   the apparatus has an inductor of an electric linear motor, by means of which a traveling electric field can be produced;
   the inductor comprises at least one first group at least with first coils;
   the first coils in the first group are arranged axially next to one another and thus form a channel;
   using the inductor it is possible to produce a traveling field in the channel which has a magnetic flux density having a gradient in the axial direction of the channel;
wherein
the gradient has an amplitude of greater than B=1 T, and at least some of the first coils have a conductor which has a resistivity of $\rho=0.017*10-6\Omega m$ or less.

2. The apparatus as claimed in claim 1, wherein the inductor has a second group at least with first coils.

3. The apparatus as claimed in claim 2, wherein the first group and the second group are arranged on opposite sides of the female mold, the first coils of the two groups being coaxial with respect to the die of the female mold.

4. The apparatus as claimed in claim 2, wherein the first group and possibly the second group have second coils, which engage around the first coils and are coaxial with respect to the first coils.

5. The apparatus as claimed in claim 4, wherein the first group and the second group comprise a plurality of coils, which engage around the coils and are coaxial with respect to the plurality of coils.

6. The apparatus as claimed in claim 1, wherein in each case a disk made of a magnetizable material is arranged between the first coils which are arranged coaxially next to one another.

7. The apparatus as claimed in claim 1, wherein the have an outer edge which is bent back to one side.

8. The apparatus as claimed in claim 7, wherein the bent-back edge covers an adjacent, first coil or a stack of adjacent and coaxially arranged coils.

9. The apparatus as claimed in claim 1, wherein the apparatus has means for cooling the rod-shaped material to be reformed.

10. The apparatus as claimed in claim 9, wherein the means for cooling apply a first cooling medium to the channel.

11. The apparatus as claimed in claim 10, wherein the first cooling medium is air or an oil.

12. The apparatus as claimed in claim 11, wherein the electrical current density in the first coils is greater than J=10 A/mm².

13. The apparatus as claimed in claim 1, wherein at least some of the first coils have conductors which are superconducting.

14. The apparatus as claimed in claim 13, wherein the superconducting conductors are made of a material which has a critical temperature of greater than T=77 K.

15. The apparatus as claimed in claim 1, wherein at least some of the first coils have conductors which have a channel.

16. The apparatus as claimed in claim 15, wherein a second cooling medium can be applied to the channel in the conductor 17. A method for reforming rod-shaped, electrically conductive and/or magnetizable materials using the apparatus as claimed in claim 1, having the following steps:
    Step a) in one step, the material to be reformed is introduced into the channel;
    Step b) in one step, a traveling magnetic field having a gradient lying in the channel direction is produced in the channel and has, in center of the channel, a magnetic flux density having an amplitude of greater than B=1 T; and Step c) in one step, the material is introduced into the die of the female mold.

18. The method as claimed in claim 17, wherein step c) is performed, followed by step a), and then followed by step b).

19. The method as claimed in claim 17, wherein step c) is followed by step b), and followed by step a).

20. The method as claimed in claim 17, wherein step a) is followed by step b), and followed by step c).

21. The method as claimed in claim 17, wherein step b) is followed by step a), and followed by step c).

22. The method as claimed in claim 17, wherein
Step a1) in one step, the material to be reformed is introduced into a first part of the channel;
Step a2) in one step, the material is introduced into a second part of the channel;
Step b1) in one step, the traveling magnetic field is produced in the first part of the channel; and
Step b2) in one step, the traveling magnetic field is produced in the second part of the channel.

23. The method as claimed in claim 22, wherein the steps are carried out in the following sequence: Step a1), Step c), Step b1) ((+)) and Step b2).

24. The method as claimed in claim 22, wherein the steps are carried out in the following sequence: Step b1) ((+)) and Step b2), Step a1), Step c), and Step a2).

\* \* \* \* \*